US011117227B2

(12) United States Patent
Russo et al.

(10) Patent No.: US 11,117,227 B2
(45) Date of Patent: Sep. 14, 2021

(54) CLIP INSTALLATION TOOL

(71) Applicant: Magna Exteriors Inc., Concord (CA)

(72) Inventors: Joseph A. Russo, Winston, GA (US); Andrew Lander, Douglasville, GA (US)

(73) Assignee: Magna Exteriors Inc., Concord (CA)

( * ) Notice: Subject to any disclaimer, the term of this patent is extended or adjusted under 35 U.S.C. 154(b) by 173 days.

(21) Appl. No.: 16/309,366

(22) PCT Filed: Jun. 13, 2017

(86) PCT No.: PCT/IB2017/053516
§ 371 (c)(1),
(2) Date: Dec. 12, 2018

(87) PCT Pub. No.: WO2017/216730
PCT Pub. Date: Dec. 21, 2017

(65) Prior Publication Data
US 2019/0337103 A1 Nov. 7, 2019

Related U.S. Application Data

(60) Provisional application No. 62/349,453, filed on Jun. 13, 2016.

(51) Int. Cl.
*B23P 19/00* (2006.01)
*B25J 9/16* (2006.01)
(Continued)

(52) U.S. Cl.
CPC .......... *B23P 19/007* (2013.01); *B23P 19/001* (2013.01); *B23P 19/004* (2013.01); *B23P 19/006* (2013.01);
(Continued)

(58) Field of Classification Search
CPC .............................. B23P 19/007; B23P 19/001
See application file for complete search history.

(56) References Cited

U.S. PATENT DOCUMENTS 4,510,683 A * 4/1985 Fedde ................ B23P 19/00
29/701
4,686,750 A 8/1987 Murakawa
(Continued)

OTHER PUBLICATIONS

International Search Report for Application No. PCT/IB2017/053516, dated Sep. 25, 2017.

*Primary Examiner* — Thomas Randazzo
(74) *Attorney, Agent, or Firm* — Warn Partners, P.C.

(57) ABSTRACT

Clip installation tooling and method for installing clips including a magazine for holding a plurality of clips and clip end of arm tooling for picking up at least one clip at a time. The magazine stops at predetermined intervals for spacing each respective clip into openings on the magazine. The clip end of arm tooling has at least one body connected to a plurality of cylinders each with an inlet/outlet port receiving vacuum/air blow off. The clip end of arm tooling picks up one or more clips from the magazine at a time. The vacuum generation to the port(s) assists in holding the clip(s) and eliminates dropping clip(s) prior to placement for installation of the clip(s). After the clip(s) is/are placed, air blow off through the port(s) insures clip(s) are removed from the clip end of arm tooling and stay in the desired position(s).

19 Claims, 9 Drawing Sheets

(51) Int. Cl.
*B25J 15/06* (2006.01)
*B60J 10/36* (2016.01)
*B23P 19/04* (2006.01)
*B65G 47/91* (2006.01)

(52) U.S. Cl.
CPC ............. *B23P 19/04* (2013.01); *B25J 9/1687* (2013.01); *B25J 15/0616* (2013.01); *B25J 15/0658* (2013.01); *B60J 10/36* (2016.02); *B65G 47/91* (2013.01)

(56) References Cited

U.S. PATENT DOCUMENTS

| | | | | |
|---|---|---|---|---|
| 4,689,866 A | * | 9/1987 | Cartwright | H01L 21/67126 29/240 |
| 4,787,662 A | | 11/1988 | Dewez | |
| 4,901,431 A | * | 2/1990 | Gast | B21J 15/32 29/707 |
| 4,922,603 A | * | 5/1990 | Kosmowski | B23Q 3/15706 483/56 |
| 5,036,576 A | * | 8/1991 | Gast | B21J 15/32 29/407.01 |
| 5,582,450 A | * | 12/1996 | Nagai | B65G 47/91 29/743 |
| 10,232,897 B2 | * | 3/2019 | Hafenrichter | B62D 57/032 |
| 2002/0185806 A1 | * | 12/2002 | Dettman | B21D 43/20 271/104 |
| 2008/0244888 A1 | * | 10/2008 | Sarh | B21J 15/142 29/402.01 |
| 2009/0041562 A1 | * | 2/2009 | Kobayashi | B23P 19/007 414/17 |
| 2010/0018354 A1 | * | 1/2010 | Kuboyama | B25B 23/08 81/57.37 |
| 2014/0250659 A1 | * | 9/2014 | MacDougall | B65G 47/915 29/428 |
| 2015/0128524 A1 | * | 5/2015 | Chen | A22C 11/125 53/138.2 |
| 2015/0181777 A1 | * | 6/2015 | Teraoka | H05K 13/043 414/752.1 |
| 2015/0266147 A1 | * | 9/2015 | Reid | B23P 21/004 29/525.01 |
| 2016/0008869 A1 | * | 1/2016 | Oberoi | G05B 19/41805 411/506 |

\* cited by examiner

CLIP INSTALLATION TOOL

CROSS-REFERENCE TO RELATED APPLICATIONS

This application is a National Stage of PCT International Application No. PCT/IB2017/053516, filed Jun. 13, 2017, which claims the benefit of U.S. Provisional Patent Application No. 62/349,453, filed Jun. 13, 2016. The disclosures of the above applications are is incorporated herein by reference.

FIELD OF THE INVENTION

The present invention relates to a tool assembly and a method for automated clip installation.

BACKGROUND OF THE INVENTION

Automotive components are attached in any number of ways, such as with adhesive and/or fasteners, e.g., screws, rivets, etc. Attachment clips such as plastic molded clips generally are used in automotive parts to provide the attachment of trim pieces, panels or other parts to the support structure of the vehicle. There are various types of clips and applications in automotive. One known type of clip attaches (e.g., slid in or otherwise attached) to a feature commonly called a "doghouse". Typical clips include a circular profile portion(s) or is a winged clip or a radial clip. Since clips and parts can vary, virtually all applications require tolerance control of the attachment.

Whatever the clip design is, it must be picked up so that it can be installed on the part. There are no known automated approaches. Common non-automated solutions for picking up plastic clips use mechanical lock mechanisms of some sort to pick up each clip. Most of these solutions are complicated and are in need of constant adjustment due to clip variations.

Existing manual insertion processes for attachment clips to parts, such as rocker panels for vehicles, is time consuming and not ergonomically friendly. Additionally, the potential for quality errors, such as missing or unseated clips, is very high.

It is therefore desired to have an automated attachment clip installation system and method for installing clips that is ergonomic, repeatable, and meets quality requirements.

SUMMARY OF THE INVENTION

The present invention generally relates to a clip installation tool system and method including a magazine for aligning a plurality of clips and clip end of arm tooling for picking up the clips. The magazine has a plurality of openings, such as slotted openings, each holding a loaded clip. A servo cylinder is used to stop the magazine in locations at predetermined intervals for spacing the clips into each respective opening, such as to align the clips in a row in the magazine. The clip end of arm tooling has at least one body or manifold with a plurality of inlet/outlet portions or "pegs" or "cylinders". The pegs are generally cylindrical. The distal end of each peg is shaped for picking up and holding a respective clip, e.g., mechanically holding each clip. The proximal end of each peg is operably connected to the body. The clip end of arm tooling picks up the desired number of clips at once (one or more clips depending on the application) from the magazine and vacuum generation to the peg(s) assists with holding the clip(s). The vacuum applied to the pegs helps compensate for clip variations, assists in holding the clips, assists with sensing (e.g., in verifying a clip is present), and eliminates dropping of the clips prior to desired placement. Once the clip(s) is/are installed or otherwise put in position, air blowoff to the specific peg(s) is applied to insure foam or other clip structures stay in place on the clip and to insure the clip is removed from the peg(s) and stay in the desired position(s). After all clips are placed, the vacuum is cycled to verify all clips were removed from the pegs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
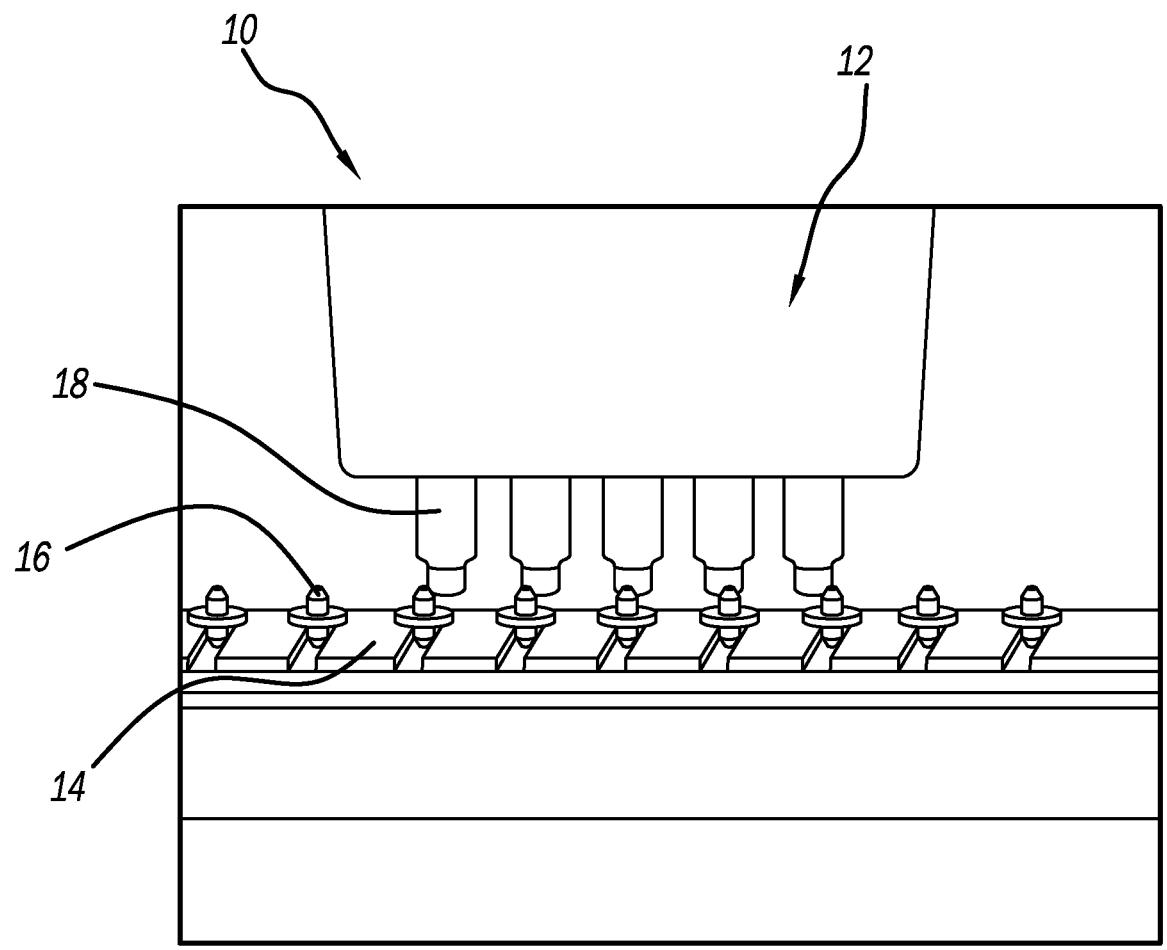
FIG. 1 is a front elevation view of a magazine and clip end of arm tooling of a clip installation tool system next to a plurality of clips to be picked up, in accordance with one embodiment of the present invention.
Figure 2:
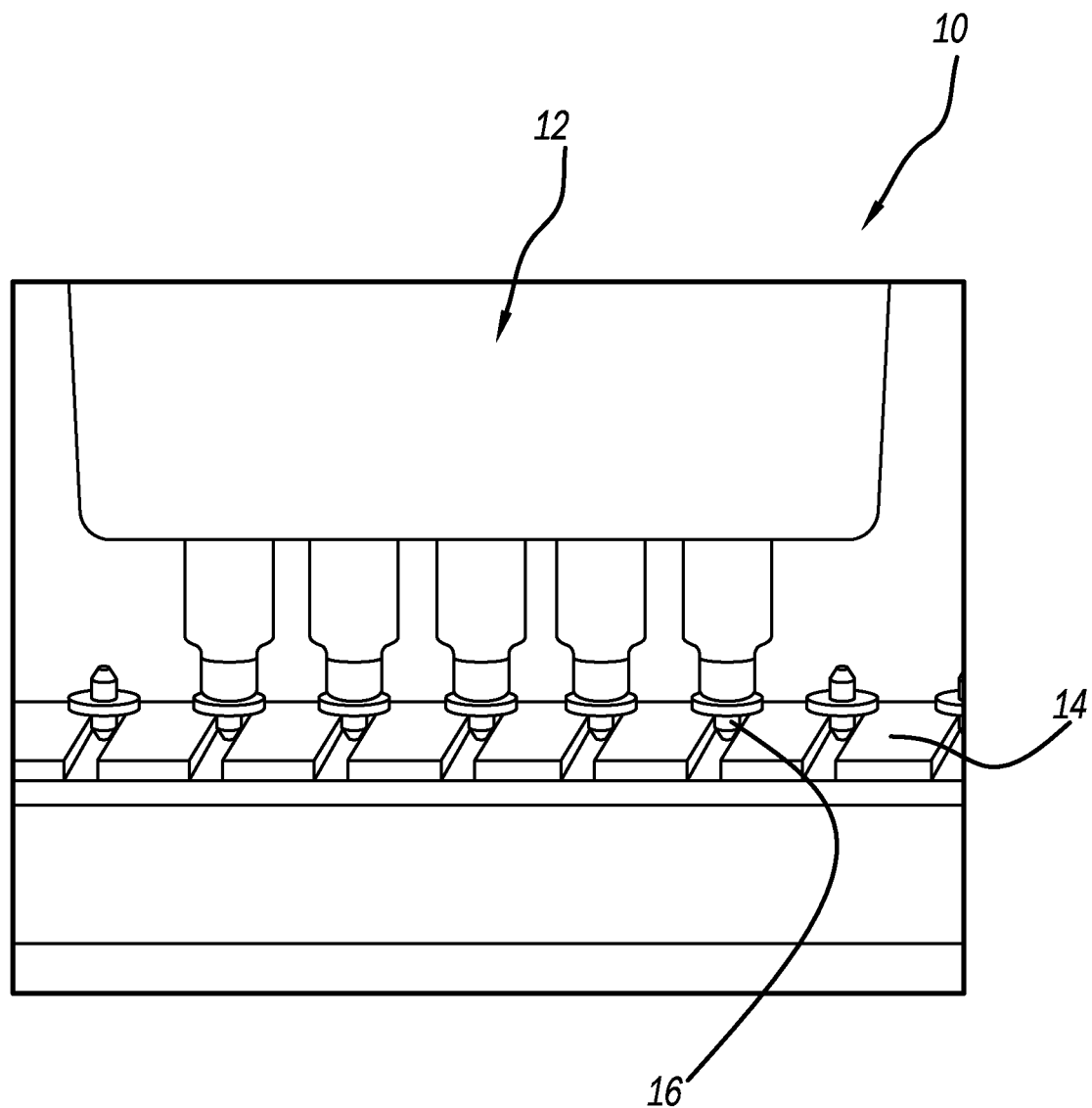
FIG. 2 is a front elevation view of the clip end of arm tooling engaging the clips in position for removing the plurality of clips from the magazine, in accordance with the present invention.
Figure 3:
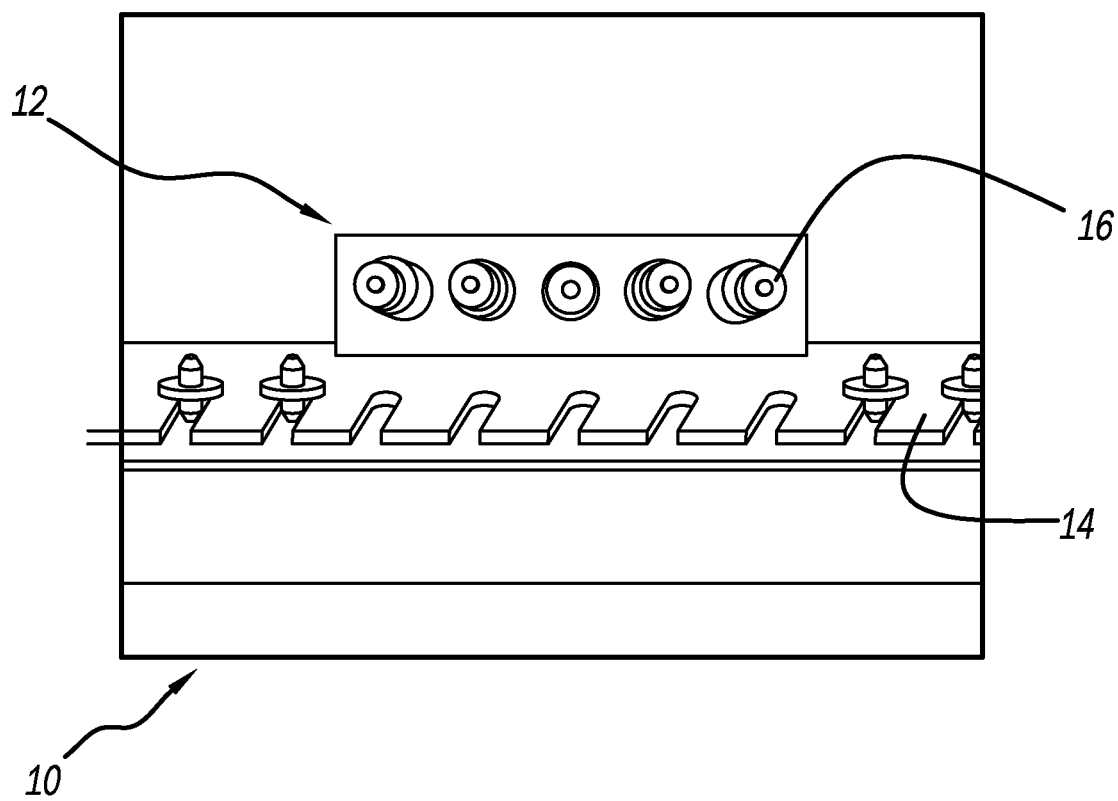
FIG. 3 is a bottom view of the clip end of arm tooling depicted for showing the tooling holding the clips, according to the present invention.
Figure 4:
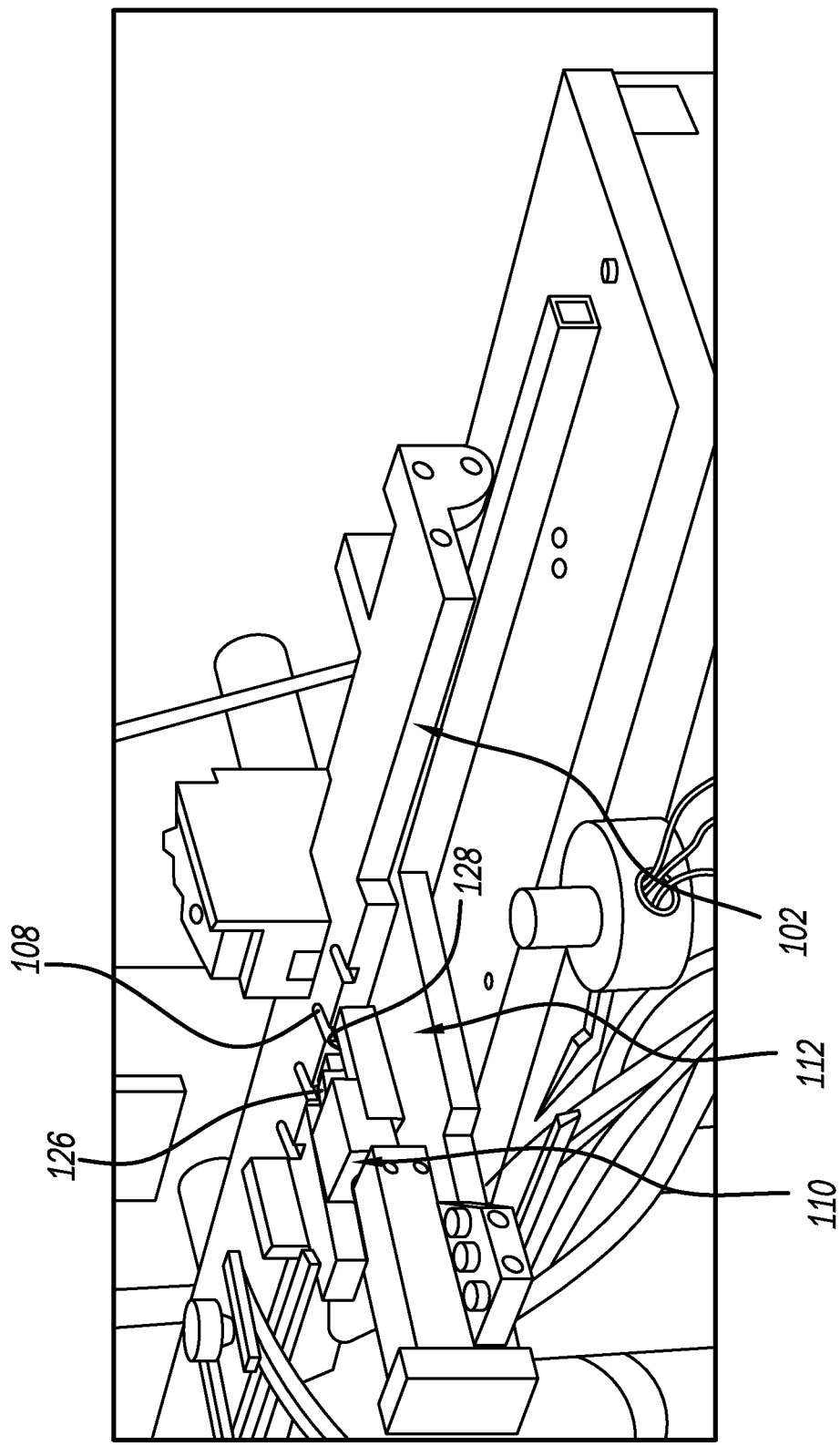
FIG. 4 is a perspective view of a magazine and a servo cylinder and feeder device of a clip installation tool system before clips are loaded to the magazine, in accordance with another embodiment of the present invention.
Figure 5:
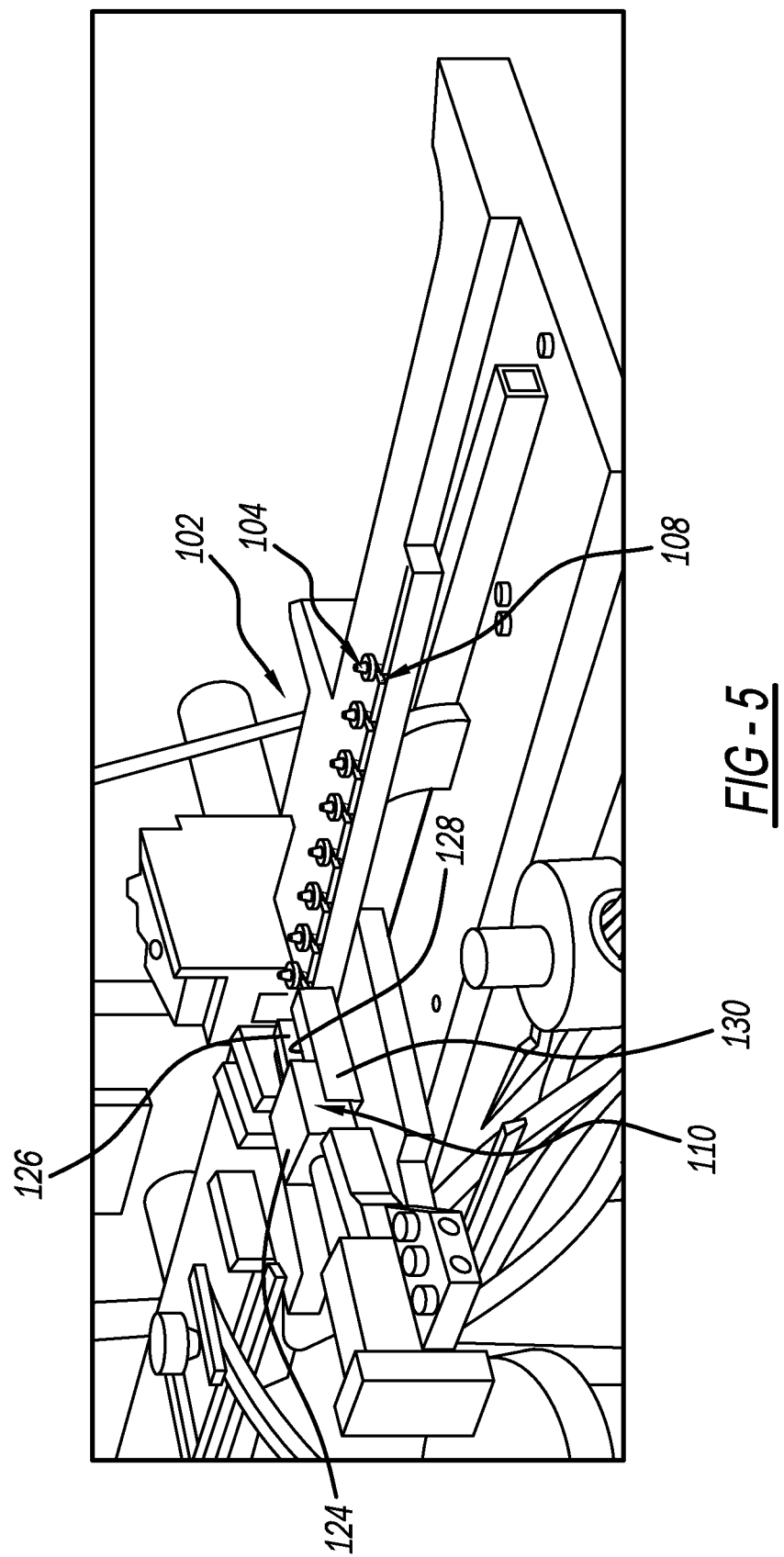
FIG. 5 is a perspective view of a magazine and a servo cylinder and feeder device of a clip installation tool system having a plurality of clips loaded to the magazine, in accordance with the present invention.
Figure 6:
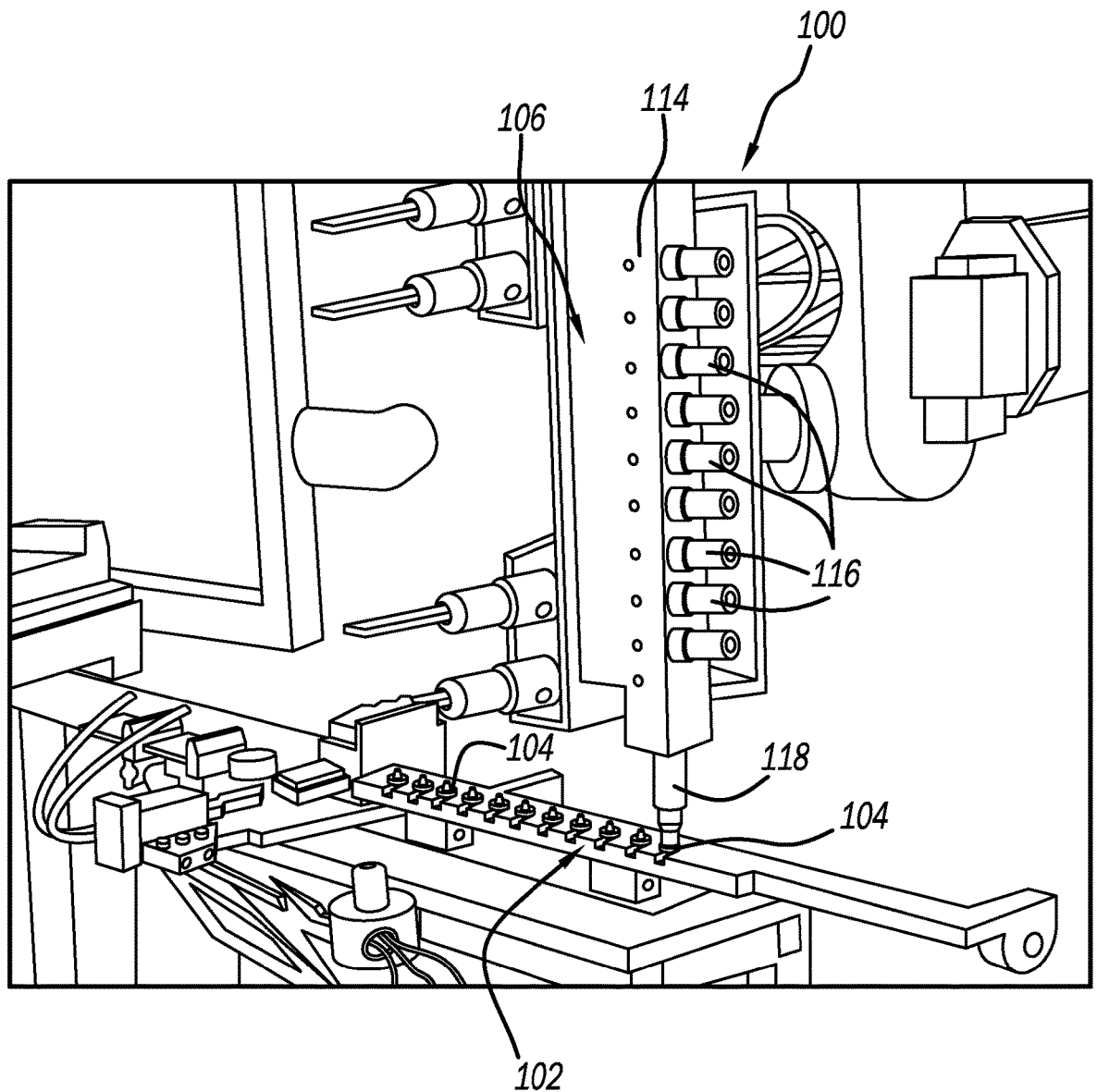
FIG. 6 is perspective view of the clip installation tool system with a peg in position to pick up one clip from the magazine, according to the present invention.
Figure 7:
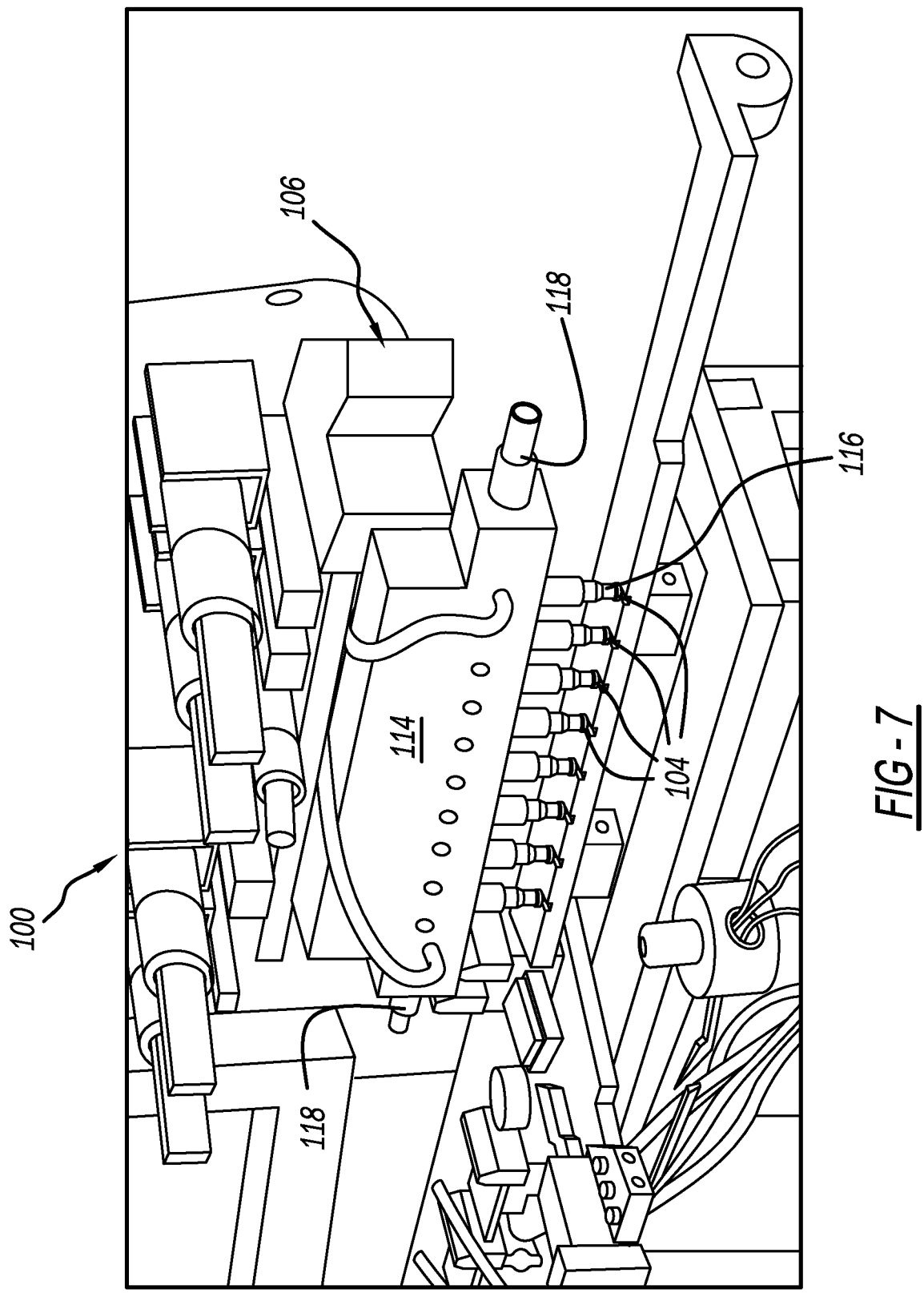
FIG. 7 is perspective view of the clip installation tool system that is rotated to bring a plurality of pegs in position for picking up a plurality of clips from the magazine, according to the present invention.
Figure 8:
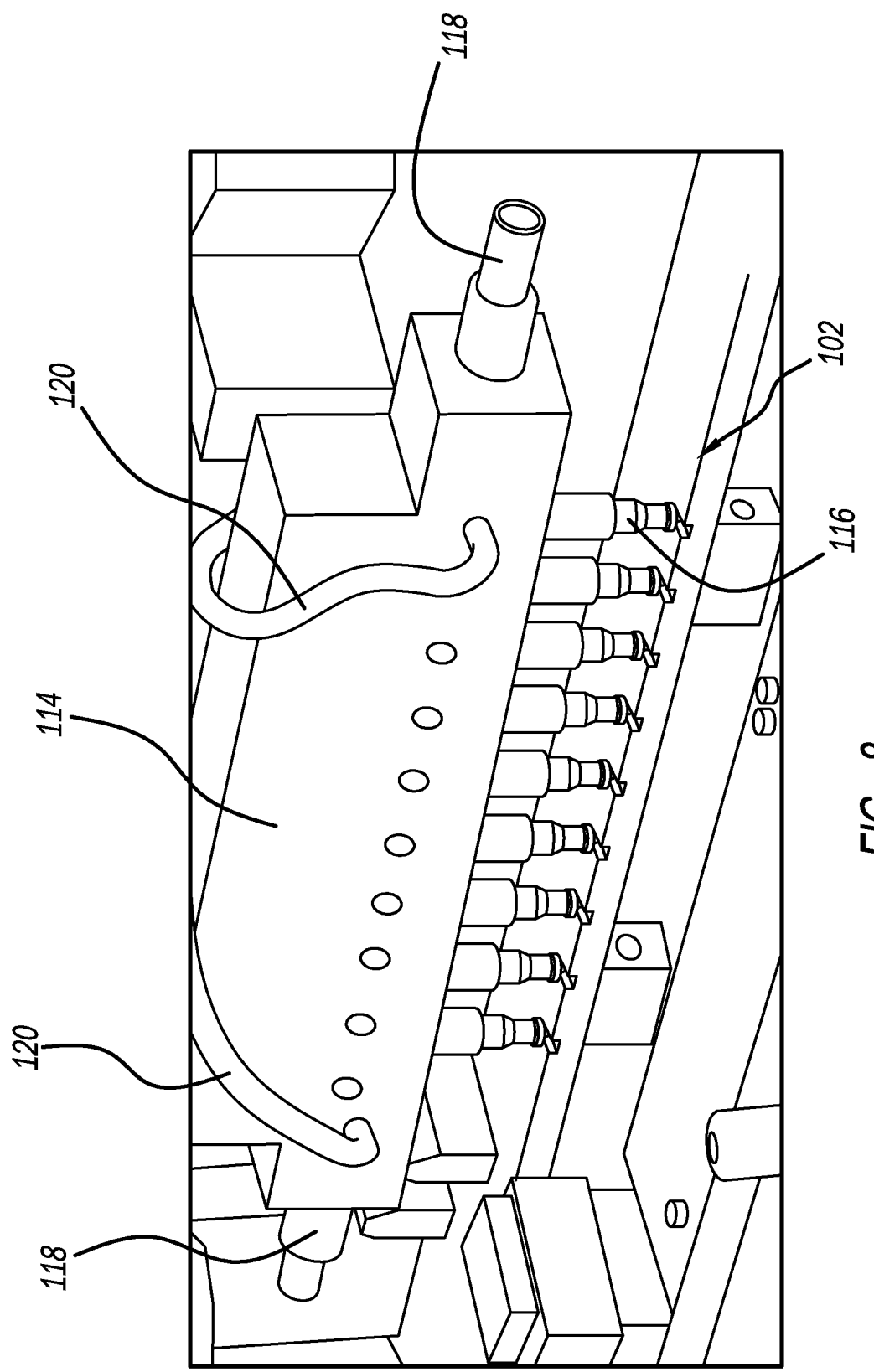
FIG. 8 is an enlarged perspective view of the clip installation tool system to move a plurality of clips along the slot of the magazine to remove the clips from the magazine, according to the present invention; and, FIG. 9 is perspective view of the clip installation tool system that is rotated to bring another peg into engagement with another clip to retrieve the clip from the magazine, according to the present invention.
Figure 9:
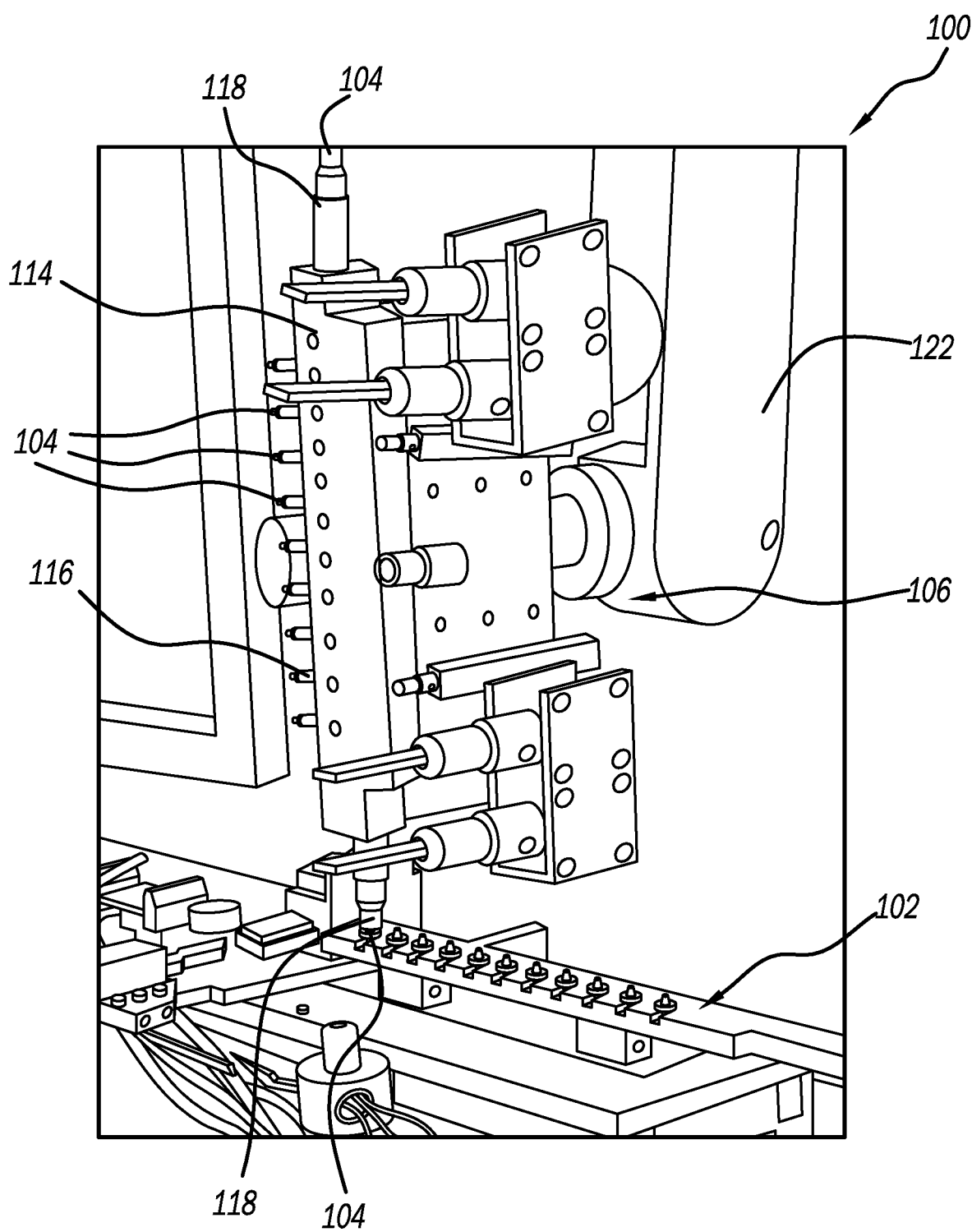

Referring to FIGS. 1-3 generally, in accordance with the present invention, there is provided a clip installation tool system shown generally at 10 including a clip end of arm tooling shown generally at 12 and at least one clip holding device 14 or "magazine" that holds a plurality of clips 16 simultaneously. The clip end of arm tooling 12 has at least one clip loading device 18 or "peg" or "inlet/outlet portions" operable for picking up at least one clip 16 at a time, preferably, picking up a plurality of clips 16 at the same time. The clip loading device 18 preferably picks up a plurality of clips 16 and delivers the clips to a part for assembly, e.g., in the manufacture of an automotive component/assembly. The magazine 14 is preferably an elongated part with a plurality of lateral openings, preferably, slots, to slidably receive the clips 16 and retain the clips 16 for retrieval by the pegs 18. The pegs 18 are generally cylindrical with an opening sized to retrieve and hold the clip 16 on the end of the peg 18. When the pegs 18 are brought into engagement with the clips 16, a vacuum is applied to hold and detect the clip 16. The pegs 18 are moved as a unit to slide the clips 16 laterally out of the elongated opening. Thus, the system 10 can retrieve a plurality of clips 16 at the same time, which is a significant advantage in cycle time.

Referring to FIGS. 4-9 generally, in accordance with the present invention, there is provided a clip installation tool system shown generally at 100 including at least one magazine shown generally at 102 for aligning a plurality of clips 104 and at least one clip end of arm tooling ("EOAT", shown generally at 106) for picking up a predetermined amount of the clip 104 at once. The magazine 102 has a plurality of openings 108, which shape and dimensions correlate with the particular clip depending on the application. While the figures illustrate openings slotted along the edge of the magazine, wherein each opening holds a loaded clip, it is within the scope of the present invention that other configurations are contemplated without departing from the scope of the present invention.

At least one servo cylinder device 110 (or any other or additional suitable device, actuator, motor, ECU, etc, and combinations) is utilized and the magazine 102 is stopped at predetermined intervals for spacing the clips 104 into each respective opening 108, such as to align the clips in a row in the magazine 102. A clip feeder shown generally at 112, e.g., a bowl feeder, is operably attached adjacent to the magazine 102 and servo cylinder 110 for feeding clips 104 to the magazine 102. With the use of the magazine 102 design and servo cylinder 110 to operably stop the magazine, the clips are aligned in a row (or any other predetermined desired pattern and intervals) for the clip installation process, allowing a plurality or clips to be picked up at once (or just one whenever desired). Thus, the magazine 102 is used to get the clips 104 in position for the process (with the servo cylinder 110 and clip feeder 112 attached. A drive mechanism advances the linearly magazine 102 for loaded clips 104 into the openings 108.

The EOAT 106 has at least one body 114 or manifold with a plurality of inlet/outlet portions or "pegs" 116. Preferably, these pegs are generally cylinder shaped with an inlet/outlet port at the distal end, and are operably coupled at the proximal end to the body 114. Optionally, one or more additional peg 118 is provided on one or both ends of the body (e.g., substantially similar design and function to the pegs 116). The distal end of each peg 116 is operably shaped for picking up and holding a respective clip 104, e.g., mechanically holding each clip. In one embodiment, the peg 116 is generally round with a specifically shaped tip to utilize the clip 104 mechanically. By way of example, the tip of the peg 116 has a smaller diameter portion used for mechanically holding the clip 104

Vacuum is used to hold and detect each clip on the EOAT 106. By adding this vacuum generation to the peg 116, there is compensation for clip 104 variation, assistance in holding the clip 104, sensing, and elimination of dropping clips 104. At least one vacuum line 120 is operably connected to the body 114 and to a vacuum pump to provide the predetermined vacuum. A control unit controls the vacuum pump. In a preferred embodiment, the pump is a smart pump so that feedback is used for sensing the clip 104 on each peg 116.

The EOAT 106, moved by a robotic arm 122, picks up the desired number of clips 104 at once (one or more clips 104 depending on the application) from the magazine 102 and vacuum generation to the peg(s) 116 (and 118 when used) assists with holding the clip(s) 104 in the cylinders 116,118. The vacuum applied to the pegs 116 helps compensate for clip variations, assists in holding the clips, assists with sensing (e.g., in verifying a clip is present), and eliminates dropping of the clips prior to desired placement. Once the clip(s) 104 is/are installed or otherwise put in position, air blowoff to the specific peg(s) 116,118 is applied to insure foam or other clip structures stay in place on the clip 104 and to insure the clip 104 is removed from the peg(s) and stay in the desired position(s). After all clips 104 are placed, the vacuum is cycled to verify all clips 104 were removed from the pegs 116,118. The on/off peg vacuum and on/off peg blow off is specifically delivered to each of the pegs 116,118 individually, in a preferred embodiment.

In a preferred embodiment, the servo cylinder 110 includes a reciprocatable block 124 with at least one narrower portion 126 that fits within a respective groove 128 formed in the feeder 130. The block 124 reciprocates toward/away from the magazine 102 in intervals corresponding with advancement of the magazine 102 to align each opening 108 of the magazine in series to the open end of the groove 126. When the block 124 is pulled away from the magazine 102, a clip 104 is operably fed automatically into the groove 126. At least one clip 104 is fed to the groove 128 at a time. The magazine 102 is advanced to align an empty opening 108 with the open end of the groove 126 adjacent the magazine opening 108. The block 124 then moves toward the magazine 102 pushing the clip 124 along the groove 126 using the narrower portion 126 and the clip 104 is pushed into the opening 108. The block 124 is withdrawn and the next clip 104 is loaded into the groove 126. The process is repeated until the predetermined number of clips 104 are loaded into the magazine 102. The EOAT 106 is then used to pick up all of the clips 104 held in the openings 108. After the clips 104 are picked up, the EOAT 106 rotates to a final assembly cell or station to unload the clips 104 into predetermined areas of the part being manufactured.

Because the magazine 102 has a plurality of aligned clips 104, multiple pegs 116 are able to be placed in a line (e.g., more or less than 8 or 9 pegs), which reduces the time it takes to pick up the clips 104 needed for the part being assembled, e.g., by picking all 8 clips 104 up at one time. Assembly with multiple clips 104 in line allows for reduced pick up time.

Use of nylon (plastic) for the body for rigidity, wear, and reduced weight is preferred, e.g., of the peg 116,118, peg tips, and/or body 114.

Once the clip 104 is put in position, blow off is supplied through the peg 116. This air blow off is used to ensure foam, or any alternative or additional component(s) of the clip, are kept from sticking to the peg 116, and that the clip is removed from the peg 116. In a preferred embodiment, multiple clips 104 are picked up at once (one per peg), each clip 104 held by vacuum passing through the EOAT 106, and at least one clip 104 is put in place on the part, and, upon placement on that part, air blow off is supplied through the EOAT 106 to that at least one peg that had held the respective clip 104. Blow off is supplied to at least one peg at a time. Depending on the particular application, to a plurality of pegs 116.

According to an embodiment of the present invention, the plurality of pegs 116 are provided inline on the body 114 of the EOAT 106 and at least one additional peg 118 is provided on each end of the body 114 of the EOAT 106. A plurality of clips 104 are loaded into a feeder 112, the clips 104 are then loaded to the magazine 102 (e.g., 11 clips 104) from the feeder 112, the arm 122 moves the EOAT 106 into position such that a peg 118 is over a clip 104, the clip 104 is picked up by the peg 118 as the vacuum is turned on, the EOAT 106 moves to slide the clip 104 laterally out of the opening 108, the EOAT 106 is rotated and moved to bring pegs 116 over more clips 104 in the magazine 102, a plurality of clips 104 (e.g., 9 clips) are picked up at the same time by pegs 116 as the vacuum is turned on, the EOAT 106 moves to slide the clips 104 out of the openings 108, the EOAT 106 is rotated and moved again to be over more clips 104 in the magazine 102, at least one clip 104 is picked up by the other of the end pegs 118 as the vacuum is turned on, EOAT 106 moves to the clips 104 out of the openings 108, e.g., lateral openings. Now with all the clips 104 retrieved from the magazine 102 and held by the pegs 116,118, the EOAT 106 is operably moved to the part to which the clips 104 are to be installed (and the clips 104 are operably installed to the part), at least one clip 104 is put in place on the part as blow off is applied to the respective peg(s) 116 or 118, clip 104 placement is repeated until all the clips 104 are removed from the EOAT 106, optionally, vacuum is applied through all the pegs 116,118 to verify no clips remain on the EOAT 106.

The invention inserts attachment clips reliably with a high degree of precision. Additionally, the machine "self checks" or poka-yokes itself to determine if all clips are present and properly installed before releasing the part. The machine is much faster and more reliable than a human operator.

The tooling and process automatically and repeatedly installs clips to the proper depth and provide an electronic poka-yoke to verify that clips where properly installed.

It is understood that any other type of fastener is contemplated, including, but not limited to, clips, threaded fasteners, winged clips, radial clips, spring steel nuts, self-tapping fasteners, and combinations thereof are contemplated without departing from the scope of the present invention. It is further contemplated that installation is to molded-in doghouse or heat staked, or any other suitable predetermined attachment without departing from the scope of the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. Clip installation tooling, comprising:
    at least one clip holding device operable to receive a plurality of clips aligned at predetermined spacing, wherein the at least one clip holding device comprises a plurality of lateral openings to receive the plurality of clips, respectively;
    end of arm tooling having a plurality of pegs alignable with the plurality of clips, each peg operable for picking up and holding a respective clip from the clip holding device; and
    a pump for selectively applying vacuum, to the plurality of pegs to pick up the plurality of clips simultaneously, and air blow off to selectively release clips from the pegs.

2. The clip installation tooling of claim 1, further comprising a servo cylinder device operable to stop the at least one clip holding device at predetermined intervals for loading each clip to the least one clip holding device.

3. The clip installation tooling of claim 1, wherein the pump is a vacuum pump with feedback control for sensing the clip in the peg.

4. The clip installation tooling of claim 1, further comprising a robotic arm operable to move the end of arm tooling laterally to slide the plurality of clips, held by the plurality of pegs, from the lateral openings.

5. The clip installation tooling of claim 4, wherein the robotic arm is operable to move the end of arm tooling to a predetermined position for installation of the clips to a final assembly.

6. The clip installation tooling of claim 1, wherein the plurality of pegs are located inline on the end of arm tooling.

7. The clip installation tooling of claim 6, wherein the plurality of pegs further include at least one additional peg on the end of the end of arm tooling.

8. The clip installation tooling of claim 6, wherein the plurality of pegs further include at least one additional peg on both ends of the end of arm tooling.

9. The clip installation tooling of claim 1, further comprising a feeder operable for loading the clips to the at least one clip holding device.

10. The clip installation tooling of claim 9, wherein the feeder includes at least one groove that receives at least one clip at a time for loading the clips to the at least one clip holding device.

11. The clip installation tooling of claim 10, wherein the groove is open on one end and operably aligns with slots in the at least one clip holding device for loading the plurality of clips at intervals.

12. The clip installation tooling of claim 11, further comprising a reciprocating block portion that pushes each clip from the groove to the slots in the at least one clip holding device.

13. The clip installation tooling of claim 12, further comprising a servo cylinder operable to reciprocate the block portion into and out of engagement with the groove.

14. The clip installation tooling of claim 12, wherein the block portion includes a narrower portion that slides within the groove to selectively load each clip.

15. An automated fastener installation system, comprising:
    at least one magazine with a plurality of lateral openings to each receive a respective one of a plurality of fasteners;
    at least one feeder device for sequencing loading of each of the plurality of fasteners into each of the lateral openings operably brought into alignment with the feeder device;
    a plurality of cylindrical ports operable to receive a vacuum, wherein the plurality of ports hold the plurality of fasteners, respectively, at the same time and the vacuum ensures the fastener is held to the cylindrical port until desired to be released;

and a vacuum pump with a control unit to control the vacuum pump, wherein the vacuum pump includes feedback sensing of the plurality of fasteners.

16. The automated fastener installation system of claim 15, wherein said plurality of lateral openings are provided in a line in the magazine, each opening receiving a respective fastener.

17. The automated fastener installation system of claim 15, wherein the plurality of cylindrical ports are located inline on a body portion end of arm tooling, and at least one additional cylindrical port is located on each end of the body portion, wherein the body portion is operably selectively rotatable to bring each cylindrical port into contact with the fasteners.

18. A method for installing clips to a part, comprising:
providing a plurality of clips for attachment to an automotive component;
providing a magazine having a plurality of openings for receiving the clips;
providing end of arm tooling having a plurality of pegs for picking up the clips;
providing a vacuum pump operably connected to the end of arm tooling;
loading the clips to the magazine;
moving the end of arm tooling to bring the pegs into position to pick up multiple clips from the magazine;
picking up all the clips while vacuum is applied;
operably placing the clips into predetermined position on the part as air blow off is applied to the pegs; and,
operably installing the clips.

19. The method of claim 18, further comprising a robotic arm operable to move the end of arm tooling laterally to slide the plurality of clips, held by the plurality of pegs, from the plurality of openings.

* * * * *